No. 850,042. PATENTED APR. 9, 1907.
J. E. NORRIS.
HAY LOADER.
APPLICATION FILED MAR. 21, 1906.
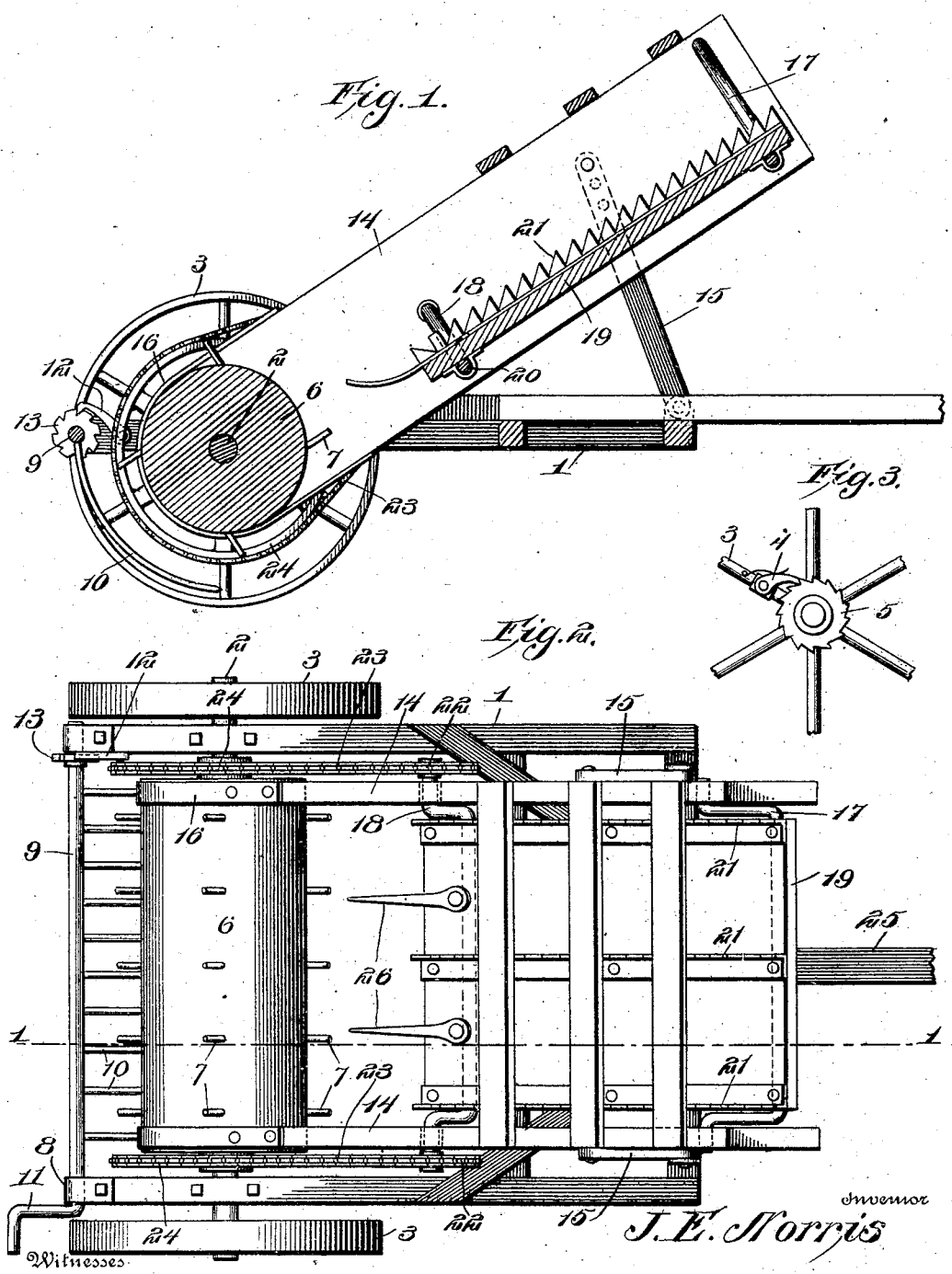

UNITED STATES PATENT OFFICE.

JOHN E. NORRIS, OF TISKILWA, ILLINOIS.

HAY-LOADER.

No. 850,042. Specification of Letters Patent. Patented April 9, 1907.

Application filed March 21, 1906. Serial No. 307,295.

*To all whom it may concern:*

Be it known that I, JOHN E. NORRIS, a citizen of the United States, residing at Tiskilwa, in the county of Bureau and State of Illinois, have invented certain new and useful Improvements in Hay-Loaders, of which the following is a specification.

This invention relates to hay-loaders of the type employed for automatically gathering hay and loading the same onto a wagon behind which the loader is arranged for travel, and has for its objects to provide a comparatively simple inexpensive device of this character which in practice will efficiently perform its functions, one wherein the hay-feeding table will be positively driven from the main axle, and one in which the hay collected by the rake will be automatically delivered to the feeding-table.

With these and other objects in view the invention comprises the novel features of construction and combination of parts more fully hereinafter described.

In the accompanying drawings, Figure 1 is a vertical section taken centrally and longitudinally of the device embodying the invention, the section being taken on the line 1 1 of Fig. 2. Fig. 2 is a top plan view of the improved loader. Fig. 3 is a detail elevation of a portion of one of the wheels, showing the pawl-and-ratchet connection.

Referring to the drawings, 1 designates a frame, in which is journaled a shaft or axle 2, equipped with rotary ground-wheels 3, provided with a spring-pressed pawl 4, attached to engage a rack 5, fixed on the shaft, whereby the latter will be rotated during forward rotation of the wheels, there being also fixed upon and for movement with the shaft a drum 6, having a plurality of rows of teeth 7, while journaled in suitable bearings 8 at the rear end of the frame is a rake-bar 9, equipped with downwardly and forwardly curved tines 10, adapted to extend beneath the drum 6. The bar 9, which is provided at one end with a crank-handle 11, is normally held against movement through the medium of a gravity-operated locking member or pawl 12, arranged to engage a toothed rack 13, fixed on the bar, it being noted that under this arrangement the bar may be adjusted for varying the height of the active ends of the tines 10 relative to the ground-surface.

Sustained in the frame 1 is a pair of relatively spaced upwardly-inclined side boards or walls 14, sustained at their forward ends by braces 15 and recessed at their lower ends to fit upon the drum 6, to which the boards are attached by means of straps 16, there being suspended for oscillation between the walls 14 and by means of substantially U-shaped shafts 17 18 a hay-elevating platform or table 19, connected on the shafts by bearing-clips 20 and provided with a plurality of rows of conveying spurs or teeth 21, preferably arranged as shown, there being fixed upon the ends of shaft 18 at the outer faces of the walls 14 sprocket-pinions 22, connected by chains 23 with sprocket-gears 24, fixed upon the shaft 2 at the ends of the drum 6.

The frame 1 is equipped with a tongue or pole 25, designed for coupling the loader to a vehicle, while attached to and projecting rearwardly from the table 19 is a pair of upwardly-curved hay-receiving members or arms 26, on which the material is deposited from the drum 6.

In practice as the machine advances over the ground motion is imparted to the axle 2 by the transporting-wheels 3 for rotating the drum 6 forwardly and at the same time imparting motion to the crank-shaft 18 through the medium of the chain belts 23 for reciprocating the feeding platform or table. During travel of the machine material is collected by the rake members or tines 10, from which it is received by the toothed drum 6 and is deposited thereby onto the arms 26, which during reciprocation of the table 19 approach the drum at appropriate intervals. After being deposited upon the table 19 the material is during reciprocation of the latter fed upward by means of the teeth 21 and is finally discharged at the upper end of the elevator onto the wagon or other vehicle. It is to be particularly noted that the elevating-table 19 is positively driven from the drum-shaft 6 and that the loader is in its operation wholly automatic, and, furthermore, that by lifting the pawl 12 the bar 9 may be turned to suitably adjust the ends of the tines relative to the ground-surface. It will also be observed that during the operations of backing or turning the loader the wheels 3 may, owing to the pawl-and-ratchet connection 4 5, travel rearwardly independently of the shaft 2.

It is to be understood that in the operation of the device the movements of the table are so timed that the receiving-arms 26 will approach the drum 6 at appropriate determined intervals for properly receiving the charges of hay from the teeth 7, the throw of the crank-shaft 18 being such as to impart to the table a rearward movement sufficient for bringing the rear ends of the arms 26 approximately into contact with the surface of the drum and at each quarter-revolution of the latter.

Having thus described my invention, what I claim is—

1. In a hay-loader, a frame, an axle journaled therein and equipped with transporting-wheels, a pair of spaced side members sustained in the frame and arranged at an upward and forward inclination, a pair of substantially U-shaped crank-shafts journaled in the side members, a reciprocatory feed-table sustained by the crank-shafts between the side members and provided with rearwardly-projecting receiving-arms and with conveying-teeth, a feed-drum carried by and for rotation with the axle and having hay-engaging teeth, a rake sustained in rear of the drum, and operative connections between the axle and one of the crank-shafts for reciprocating the feed-table.

2. In a hay-loader, a main frame, an axle journaled for rotation therein and equipped with transporting-wheels, a feed-drum mounted on and for rotation with the axle, a rake sustained in rear of the drum for delivering material thereto, a pair of relatively spaced side boards sustained in the frame, said boards being arranged at an upward and forward inclination and having their rear ends recessed to receive the feed-drum, straps embracing the drum and attached to the side boards for connecting the same with the drum, a pair of substantially U-shaped crank-shafts journaled in the side boards, a reciprocatory feed-table sustained by the crank-shafts between the side boards and provided with rearwardly-projecting receiving-arms and with conveying-teeth, and operative connections between the axle and one of the crank-shafts for reciprocating the feed-table.

In testimony whereof I affix my signature in presence of two witnesses.

JOHN E. NORRIS.

Witnesses:
L. O. MAY,
J. T. KIDD.